May 13, 1924.

E. E. DUFF 1,493,973

BUMPER FOR AUTOMOBILES

Filed July 25, 1923

E. E. Duff, Inventor

By C. A. Snow & Co.

Attorneys

Patented May 13, 1924.

1,493,973

UNITED STATES PATENT OFFICE.

EDWARD E. DUFF, OF SEATTLE, WASHINGTON.

BUMPER FOR AUTOMOBILES.

Application filed July 25, 1923. Serial No. 653,737.

*To all whom it may concern:*

Be it known that I, EDWARD E. DUFF, a citizen of the United States, residing at Seattle, in the county of King and State of Washington, have invented a new and useful Bumper for Automobiles, of which the following is a specification.

This invention relates to bumpers for use in connection with automobiles, one of the objects of the invention being to provide a structure of this character which will not only protect the car when brought into contact with an unyielding obstruction but will also serve as a guard to deter drivers of other cars intentionally bumping into a machine when parked.

A further object is to provide a bumper so constructed that, should the tire of another vehicle come thereagainst, it would be scarred or punctured, this action of the bumper serving to instill caution in drivers who might otherwise be careless about colliding with other machines.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawings

Figure 1:
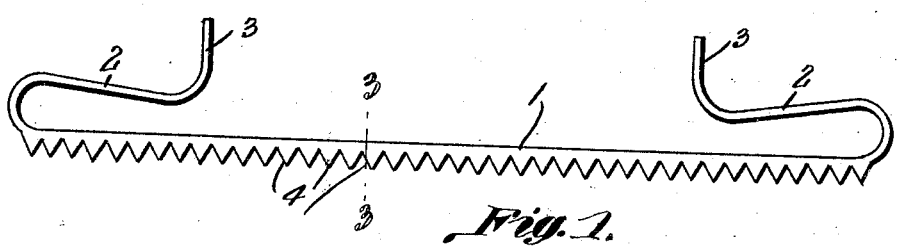
Figure 1 is a plan view of a bumper.
Figure 2:
Fig. 2 is a front elevational view.
Figure 3:
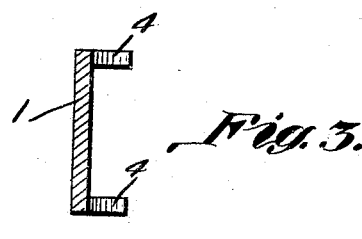
Fig. 3 is an enlarged section on line 3—3, Fig. 1.
Figure 4:
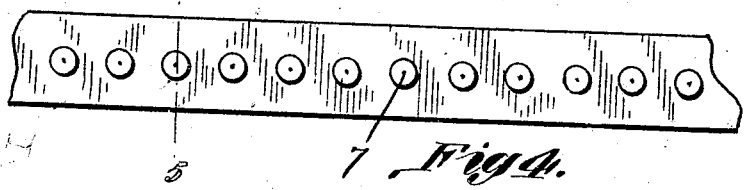
Fig. 4 is a front elevation of a portion of a modified form of bumper.
Figure 5:
Fig. 5 is an enlarged section on line 5—5, Fig. 4.

Referring to the figures by characters of reference 1 designates a bar of steel or other metal such as is usually employed in the manufacture of automobile bumpers, this bar having its ends inturned as at 2 and provided with terminals 3 for attachment to the vehicle. The specific configuration of the bumper does not constitute any part of the present invention and it is to be understood that bumpers of different shapes and sizes can be used. The present invention embodies the use of a longitudinal series of pointed teeth 4 formed along the respective edges of the bumper so that, should a wheel tire be brought against them, it would be severely scarred or punctured.

Instead of providing the bumper with saw teeth, a series of openings 5 can be formed therein and these openings can receive studs 6 extending from sharp pointed heads or spurs 7 projecting forwardly from the bumper. These heads can be secured in the openings in any manner desired.

It will be apparent that if an automobile is equipped with a bumper having projecting or pointed elements as described, a driver will exercise extreme caution to avoid colliding. Consequently many injuries that are now received by parked cars will be eliminated.

What is claimed is:—

1. An automobile bumper having projecting scarring elements on and fixed relative to the exposed face thereof.

2. An automobile bumper having pointed elements projecting from and fixed relative to the exposed face thereof.

3. The combination with an automobile bumper, of a longitudinal series of pointed elements projecting from and fixed relative to one exposed face thereof.

In testimony that I claim the foregoing as my own I have hereto affixed my signature in the presence of two witnesses.

EDWARD E. DUFF.

Witnesses:
FRANK E. BURNS,
C. H. HOWELL.